Figure 3:
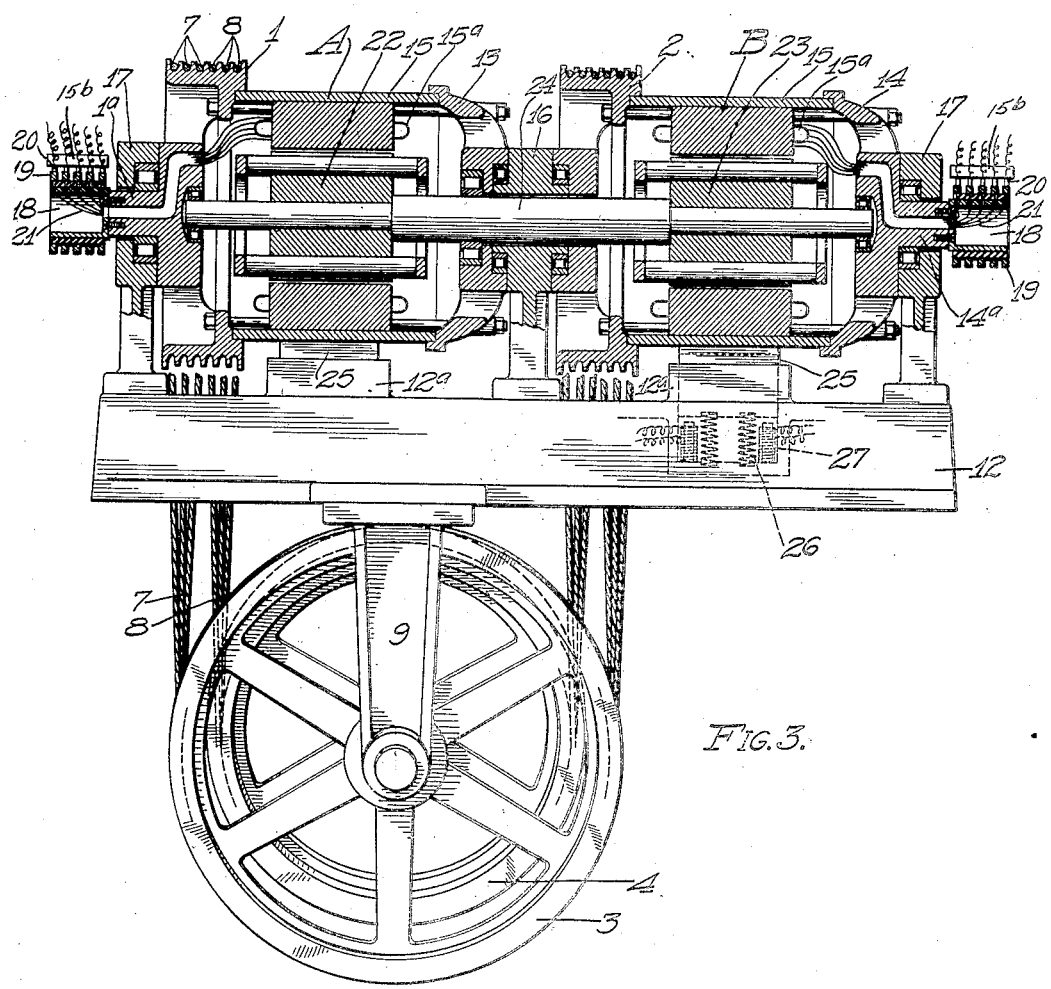

March 11, 1930.                P. MAYER                 1,750,237
             SLOW SPEED ALTERNATING CURRENT MOTOR MECHANISM
                       Filed Dec. 23, 1925        2 Sheets-Sheet 1
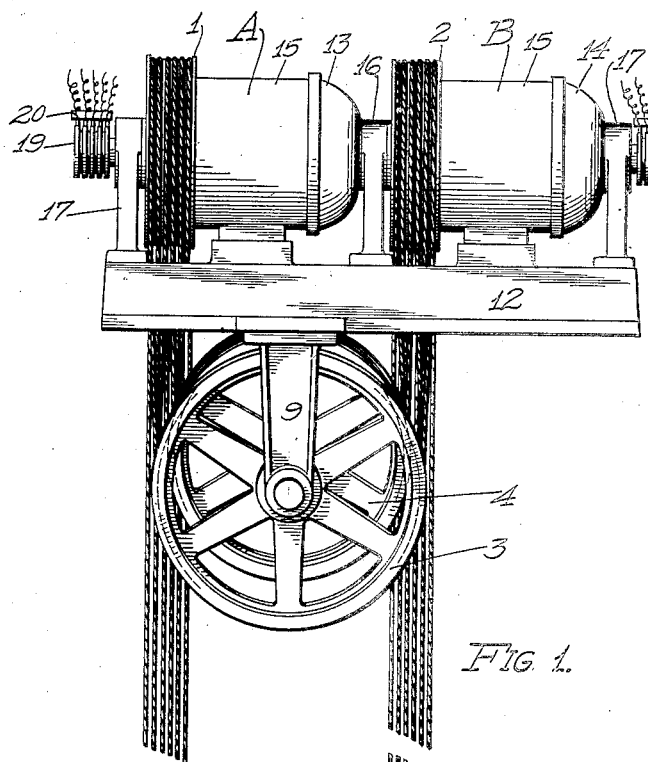
Fig. 1.
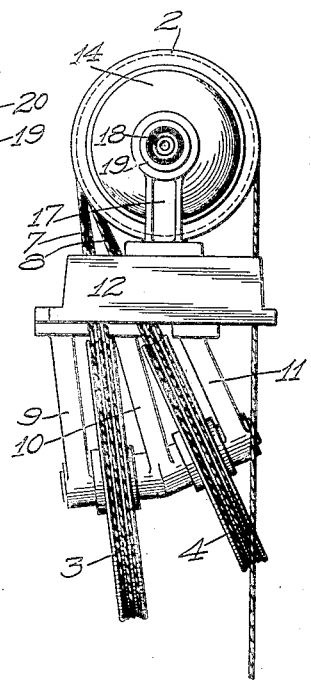
Fig. 2.
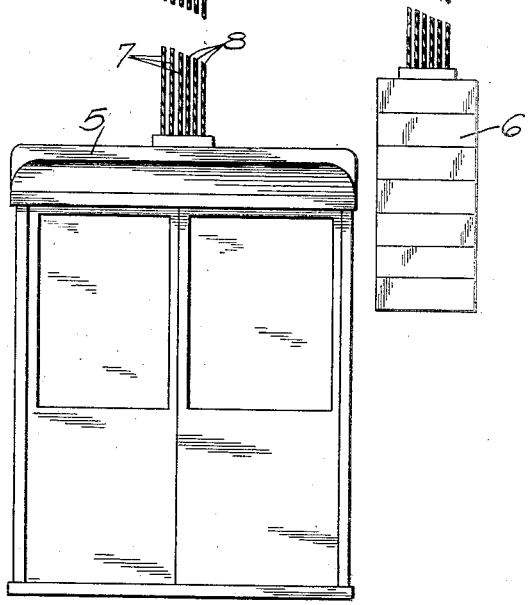
INVENTOR.
PHILIP MAYER
BY A. B. Bowman
ATTORNEY March 11, 1930.  P. MAYER  1,750,237
SLOW SPEED ALTERNATING CURRENT MOTOR MECHANISM
Filed Dec. 23, 1925  2 Sheets-Sheet 2

INVENTOR.
PHILIP MAYER
BY A. B. Bowman
ATTORNEY

Patented Mar. 11, 1930

1,750,237

UNITED STATES PATENT OFFICE

PHILIP MAYER, OF SAN DIEGO, CALIFORNIA

SLOW-SPEED ALTERNATING-CURRENT MOTOR MECHANISM

Application filed December 23, 1925. Serial No. 77,195.

My invention relates to slow speed alternating current or induction motor mechanisms, particularly to the multiphase type and more particularly adapted for gearless traction elevator or hoist systems.

Heretofore gearless traction motors, both of the alternating and direct current types, have been used in connection with elevator systems. The motors thus far produced, particularly when taken in connection with the rest of the system, have proven very expensive to manufacture and expensive to keep in repair and operation.

The objects of my invention are: first, to provide an alternating current traction motor comprising a plurality of rotating primary and secondary members, the speed of one set of such members being reduced to a suitable speed for traction work without the introduction of any loss-producing speed control mechanism; second, to provide an alternating current traction motor comprising a plurality of rotating primary and secondary members, the speed of the primary members being best adapted for gearless traction purposes, while the relative speeds of the primary and secondary members are best adapted for the economical construction of the traction motor; third, to provide an alternating current traction motor comprising a pair of independently revoluble primary members and a pair of mechanically connected induced secondary members, said primary members adapted to rotate in opposite directions at equal and relatively low speeds, said secondary members adapted to operate at relatively higher speed, the primary members being provided with power transmitting means for operating elevator cables or the like; fourth, to provide a gearless alternating current traction motor comprising a pair of independently revoluble slow speed primary members adapted to transmit mechanical power and mechanically interconnected revoluble secondary members, the direction of rotation of said primary members being adapted to be reversed with respect to each other without altering the direction of rotation of the secondary members; fifth, to provide a mechanism of this class in which the slow speed power transmitting primary members are adapted to be held stationary while the secondary members are initially set in motion, so that the starting of the set may be accomplished with least demand from the electrical supply and with least demand of mechanical effort, and further adapted, when starting the power transmitting primary members, to exert a high initial torque while limiting the starting current to a relatively low value; sixth, to provide an alternating current gearless traction motor which is so constructed as to inherently insure an absence of severe jolts or shocks in starting the mechanical power transmission, without the need of current limiting apparatus; seventh, to provide an alternating current gearless traction motor having revoluble primary members adapted to operate as a power transmitting medium at relatively low speeds, and revoluble secondary members adapted to operate at a relatively high speed with respect to said primary members, said latter cooperating with the former to exert a braking and retarding action under certain predetermined conditions; eighth, to provide an alternating current motor mechanism of this class in which a relatively high speed secondary member of extremely simple rugged and efficient construction, such as a squirrel cage rotor, may be employed, and which may be allowed to rotate continuously under all conditions of service, while the power transmitting primary members are adapted to be started, operated at constant speed and stopped by means of extremely simple control mechanism; ninth, to provide a low speed alternating current induction-motor mechanism having a wound primary member and squirrel cage secondary members, so constructed that the windings of said primary members produce a relatively high speed relationship between primary and secondary members, while the speed of the power transmitting primary members corresponds to that of an induction motor having a very much larger number of poles than the primary members; tenth, to provide a low speed induction motor of this class which is adapted to operate at a normal speed equal to approximately half the difference of the normal relative speeds of cooperating primary and secondary members and a total torque equal to the sum of the normal rated torques of the individual machines; eleventh, to provide a machine of this class in which change of direction of rotation is effected without purposely altering the magnetic densities employed, thereby permitting best utilization of material and permitting substantially constant inherent torque characteristics to be maintained in all conditions of operation; twelfth, to provide an alternating current induction motor having relatively low resistance squirrel cage rotors adapted to operate at a comparatively high speed, and relatively low speed primary members adapted to develop motoring torque and capable of developing in their locked position a relatively high starting torque; thirteenth, to provide as a whole a novelly constructed slow speed alternating current motor mechanism; and fourteenth, to provide a motor mechanism of this class which is very simple and economical of construction, particularly economical to keep in repair and in operation, which is durable, efficient, and which will not readily deteriorate or get out of order.

Figure 4:
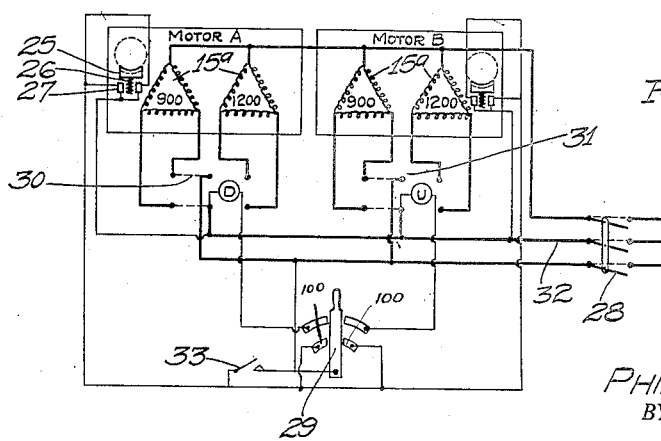

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of my slow speed alternating current motors as applied to an elevator system, showing cables extending around sheaves mounted on the motors and around an intermediate idler sheave and connected at its ends to an elevator car and a counterweight; Fig. 2 is a fragmentary view, taken at a right angle to that of Fig. 1, showing particularly the motors and sheaves; Fig. 3 is an enlarged elevational view of my motor mechanism, showing the motors partly in section and also showing the idler sheaves and the flexible connector or cable, and Fig. 4 is a wiring diagram of my motor mechanism as applied to an elevator system.

Like characters of reference refer to similar parts and portions throughout the several views of the drawings.

The preferred embodiment of my alternating current motor mechanism in conjunction with an elevator system, as illustrated, comprises a pair of multiphase induction motors A and B, each provided with a pair of revoluble rotors, sheaves 1 and 2 mounted on the outer rotors of the motors A and B, respectively, a pair of idler sheaves 3 and 4 positioned below the motors A and B, and intermediate the sheaves 1 and 2, an elevator car 5, a counterweight 6, and sets of flexible cables 7 and 8, each set extending partially around the sheaves 1 and 2 and connected at their corresponding ends to the car 5 and the counterweight 6, the first set of cables 7 extending around the inclined sheave 3 and the other set 8 extending around the idler sheave 4. It will be noted that the idler sheaves 3 and 4 are inclined with the vertical and with each other and revolubly mounted on brackets 9, 10 and 11 supported at the lower side of the motor base 12, the sheave 4 being smaller than the sheave 3, said sheaves being so arranged as to provide the greatest amount of traction around the sheaves 1 and 2 and the least inclination when passing from one sheave to the next.

The outer rotors or primary rotors of the motors A and B, consist of the combined sheave and end members, indicated by 1 and 2, other end members, indicated by 13 and 14, the frames 15 supporting the primary cores 15$^b$, the frames 15 of the motor A connecting the combined sheave and end-member 1 with the end member 13 in a rigid structure, and the frames 15 of the motor B connecting the combined sheave and end member 2 with the end member 14. Each of the primary cores is provided with a set of multispeed windings 15$^a$, corresponding to different synchronous speeds, such as a six- and eight-pole set, giving synchronous speeds of 900 and 1200 R. P. M. on a sixty-cycle supply. The frames 15 also serve as brake drums, as will be more fully described hereinafter.

The adjacent ends of the motor frames are revolubly mounted, by means of the hub portions of the end member 13 of the motor A and of the combined sheave and end member of the motor B, around opposite extended ends of an intermediate bearing bracket 16 mounted on the base 12. The axial portions of the combined sheave and end member 1, as well as the end member 14, are provided with hollow trunnions 1$^a$ and 14$^a$, respectively, which trunnions are revolubly mounted within the end bearing brackets 17. At the extended ends of said trunnions are secured cup-shaped members 18, around each of which is mounted a plurality of collector rings 19, which are insulated from the cup-shaped members 18 and connected, by means of wires 21, with the several windings of the primary rotors, said wires extending through said hollow trunnions into the interiors of the primary rotors. Said collector rings 19 are connected, by means of a plurality of terminal brushes 20, with a source of electrical energy. The inner or secondary rotors 22 and 23, of the motors A and B, are preferably mounted in alinement with each other and preferably mounted on the same shaft 24, which is revolubly mounted at its opposite ends in the combined sheave and end member 1 and the end member 14, and intermediate its ends within the end member 13 and the combined sheave and end member 2, as shown best in Fig. 3.

Below each of the frames 15 of the motors A and B are reciprocally mounted, in recesses 12ª of the base 12, brake shoes 25, which are adapted, when the electric current is turned off from the system or from the brake means, to be forced upwardly into positive engagement with the frames 15, by means of compression springs 26 positioned in the lower ends of the pockets or recesses 12ª. When the electrical energy is connected with the higher speed windings of one of the primary rotors, the brake shoes 25 are adapted to be withdrawn from engagement with the frames 15, by means of electromagnets 27 positioned preferably at the lower sides of the brake shoes 25, substantially as shown in Fig. 3.

For the sake of illustration, the high and low speed windings will hereinafter be assumed to give 1200 and 900 R. P. M. synchronous speeds, respectively, it being understood that the actual speed under these conditions will be somewhat less, owing to the normal relative slip of the primary and secondary members. Hereafter, for the sake of simplicity, the theoretical synchronous speeds will be used in referring to the various speeds produced.

Referring to Fig. 4, which shows a wiring diagram, the multiple pole switch 28 is adapted to directly connect the low speed or 900 R. P. M. windings of each primary rotor with the power line, providing the car direction switch 29 is in the neutral position shown in Fig. 4. When the car direction switch 29 is in the neutral position shown, the blades of the magnetically controlled direction switches 30 and 31 are in the position shown by dotted lines in Fig. 4, thus connecting only the 900 R. P. M. windings of the motors with the power line. Switches 30 and 31 are provided with control coils D and U, respectively, which may be alternatively energized by means of the switch 29, thus permitting either the switch 30 or 31 to be reversed. It should be here noted that the switches 30 and 31 are shown diagrammatically only as conventional double throw switches. In Fig. 4 are also shown the brake shoes 25, the operating electromagnets of which are connected directly with one of the live mains, indicated by 32, and with a switch 33 connected with another live main of the system. This switch 33 is preferably foot actuated and time controlled. Thus, when the switch 33 is disconnected and when the car direction switch is in the neutral position, the frames or primary rotors will be held stationary and permit the secondary rotors to revolve in one direction at the rate of 900 R. P. M., the connections being such that both secondary rotors always revolve in the same direction. When the car direction switch 29 is shifted to the left, the coil of the direction switch 30 is energized, operating the switch, disconnecting the 900 R. P. M. winding and connecting the 1200 R. P. M. winding of the motor A with the source of supply, while in the motor B, the 900 R. P. M. winding remains connected with the source of supply. When the above connection takes place, the electromagnet 27 is adapted to be energized, through additional contacts 100 on switch 29, as shown in Fig. 4, withdrawing the brake shoes 25 from engagement with both motor frames, permitting the latter to revolve when the power is connected with the 1200 R. P. M. winding of the primary rotor of the motor A.

With such connection of the windings with the source of power, the tendency of the 1200 R. P. M. winding of the motor A will be to increase the normal speed of the corresponding secondary rotor from 900 to 1200 revolutions, while the tendency of the 900 R. P. M. winding of the motor B is to retain the speed of its secondary rotor at 900 revolutions or to retard the acceleration of the rotors. The result will be that the frame of the motor A will revolve in a direction the reverse of its rotor, while the frame of the motor B will revolve in the same direction as its rotor. The speed of the primary rotor of the motor B, in the direction of the secondary rotors, and the speed of the primary rotor of the motor A, in the reverse direction, will be equal, and equal to one-half of the difference normally attained with such windings, which in the case illustrated is one-half of the difference between 1200 and 900, or 150 revolutions per minute in their respective directions. When the car direction switch is shifted to the opposite side, the conditions will be reversed and the primary rotor of the motor B will revolve at a speed of 150 revolutions per minute in a direction the reverse of its secondary rotor, while the primary rotor of the motor A will revolve in the same direction as its secondary rotor at speeds of 150 revolutions per minute.

This same principle may be carried out with sets of multispeed windings giving speeds of 720 and 900 R. P. M., 1200 and 1800 R. P. M., on 60-cycle supply, or the equivalent speed on other frequencies, or in any other relation, or more than two windings may be employed in each motor with corresponding results.

One of the important features of my invention is the provision of a simple regenerative brake control, the purpose of which is to enable the revolving primary rotors to be readily brought to a very low speed without the application of the magnetic braking means 25. It has been explained that in normal operation, one of the high speed primary windings and one of the low speed primary windings are connected to the source of supply, the switch 29 being thrown to the left or right according to the desired direction of rotation. If now the control switch 29 should be shifted to the neutral position, the high speed winding is disconnected, and the low speed winding is automatically connected in its place. the corresponding magnetic switch 30 or 31 functioning. It is obvious to those familiar in the art that under these conditions both primary rotors will function as generators until the relative speeds of the primary and secondary members are reduced to the corresponding synchronous speed. As, however, both secondary rotors were revolving at a speed above the lower synchronism at the moment the switch 29 was shifted to neutral, the effect is to cause both primary rotors to regenerate into the supply circuit, which, as is well understood, causes a braking action between the primary and secondary members to take place, and this action is such as to tend to reduce the secondary rotor's speed. At the same time the braking action will continue until the primary members are nearly at a standstill, while the secondary members approach a speed near the lower synchronous speed. At the correct moment the magnetic brake 25 may be applied, whereby the primary members are definitely locked, and the secondary members continue to rotate at nearly the lower synchronous speed.

Though I have shown and described a particular construction, combination and arrangement of parts and portions of a motor mechanism and a particular adaptation thereof to elevator systems, I do not wish to be limited to this particular construction, combination and arrangement, but desire to include in the scope of my invention the construction, combination and arrangement substantially as set forth in the appended claims,

Having thus described my invention, what I claim as new and desire to secure by Letters Patent is:

1. In an alternating current induction motor group, in combination, a revoluble secondary rotor means, separate, mechanically connected, oppositely revoluble primary members mounted in inductive relation with said secondary rotor means, similar windings on each primary member adapted to produce a plurality of revolving magnetic fields of different speeds, a source of alternating current, means for connecting said windings to said source of supply so that the magnetic fields in the two primary rotors are of different speeds but revolve in the same direction as the secondary rotor means, whereby said primary members are constrained to revolve in opposite directions at a speed substantially lower than the difference of said field speeds.

2. In an alternating current induction motor group, in combination, a pair of secondary members, mechanically connected and revoluble around a common axis, a pair of revoluble primary members mounted in inductive relation with said secondary members, the primary members having similar windings adapted selectively to produce in each a revolving magnetic field of one speed and a field of a lower speed, a source of alternating current supply, means for connecting the windings of said primary members to said source of supply, such that one primary member produces the higher speed field, while the other member produces the lower speed field, both fields revolving in the same direction as the secondary members, whereby said primary members are constrained to revolve in opposite directions at predetermined speeds.

3. In an alternating current induction motor group, in combination, a pair of secondary members, mechanically connected and revoluble around a common axis, a pair of revoluble primary members mounted in inductive relation with said secondary members, the primary members having similar windings adapted selectively to produce in each a revolving magnetic field of one speed and a field of a lower speed, a source of alternating current supply, means for connecting the windings of said primary members to said source of supply, such that one primary member produces the higher speed field, while the other member produces the lower speed field, both fields revolving in the same direction as the secondary members, whereby said primary members are constrained to revolve in opposite directions at predetermined speeds, and means for reversing the direction of rotation of said primary members without changing the rotation of the secondary members.

4. In an alternating current induction motor group, in combination, a pair of induction motors having mechanically connected rotatable secondary members and rotatable primary members, each primary member having a low speed winding and a high speed winding, the corresponding windings on the primaries being adapted to produce rotating magnetic fields in their primaries of the same relative speed to the primaries, a source of alternating current supply, means for normally connecting corresponding windings on the two primaries to said source of supply to operate said secondaries in the same direction and speed while said primaries remain stationary, means to change the connections to arrange the other winding on either but not both primaries in circuit with said source, all connections being made in such a manner as to produce fields rotating in the same direction, whereby the primary having its high speed winding connected moves in the opposite direction to said secondaries and the other primary moves in the same direction.

5. In an alternating current induction motor group, in combination, a pair of induction motors each having a rotatable primary member and a rotatable secondary member, said secondary members being in inductive relation to the respective primary members, means constraining said secondary members for rotation as a unit, a winding on one primary member, a plurality of windings on the other primary member, one of said windings having the same pole number as the winding on the first mentioned primary member, a source of alternating current, means for connecting said source to the winding of the first mentioned primary member and to the winding of the other primary member of the same pole number whereby said primary members remain stationary and means to connect the source to the winding of said first primary and to a winding of said second primary member of an unlike pole number, whereby said primary members rotate at equal speed in opposite directions.

6. In an alternating current induction motor group, in combination, a pair of induction motors each having an inductively related rotatable primary member and rotatable secondary member, means for maintaining said secondary members relatively fixed to one another, variable pole number windings on each primary member, one winding of one primary member having the same pole number as one winding of the other primary member, a source of alternating current, means for connecting the source to the primary windings of the same pole number and means for connecting said source to a winding on each primary member of a different pole number.

7. In an alternating current induction motor group, in combination, a pair of induction motors each having an inductively related rotatable primary member and rotatable secondary member, means for maintaining said secondary members relatively fixed to one another, variable pole number windings on each primary member, one winding of one primary member having the same pole number as one winding of the other primary member, means associating said primary members for rotation at the same speed in opposite directions, a source of alternating current, means for connecting the source to the primary windings of the same pole number whereby the secondary members are driven at a speed corresponding to said pole number and the primary members remain stationary, and means to connect said source to a winding on one primary member and to a winding of the other primary member of a different pole number, whereby said primary members rotate at a speed one half of the difference in the speeds which would result in single motors of the same pole windings as said connected primary windings.

8. In an alternating current induction motor group, in combination, a revoluble secondary rotor means, two separate revolubly mounted primary members, variable pole number windings on each primary member, one winding of one primary member having the same pole number as one winding of the other primary member, means associating said primary members for rotation at the same speed in opposite directions, a source of alternating current, means for connecting the source to the primary windings of the same pole number to cause their fields to rotate in the same direction and drive the secondary rotor only and means to connect said source to a winding of one primary member and to a winding of the other primary member of a different pole number so that both fields rotate in the same direction whereby the primary and secondary rotors all move.

9. In an alternating current induction motor group, in combination, a pair of independently revoluble primary members, variable-pole number windings on each primary member, one winding of one primary member having the same pole number as one winding of the other primary member, a pair of revoluble secondary members in inductive relation to the primary members, respectively, means for maintaining said secondary members relatively fixed to one another, a source of alternating current, means for connecting the source to the winding of one primary member and to the winding of the other primary member of the same pole number, whereby said primary members remain stationary, and means for connecting the source to a winding of one primary member and to a winding of the other primary member of unlike pole number, whereby said primary members rotate at equal speed in opposite directions.

In testimony whereof, I have hereunto set my hand at San Diego, California, this 15th day of December, 1925.

PHILIP MAYER.